April 3, 1956   R. J. FONTAINE   2,740,575
DISPENSING CONTAINER
Filed Feb. 25, 1953
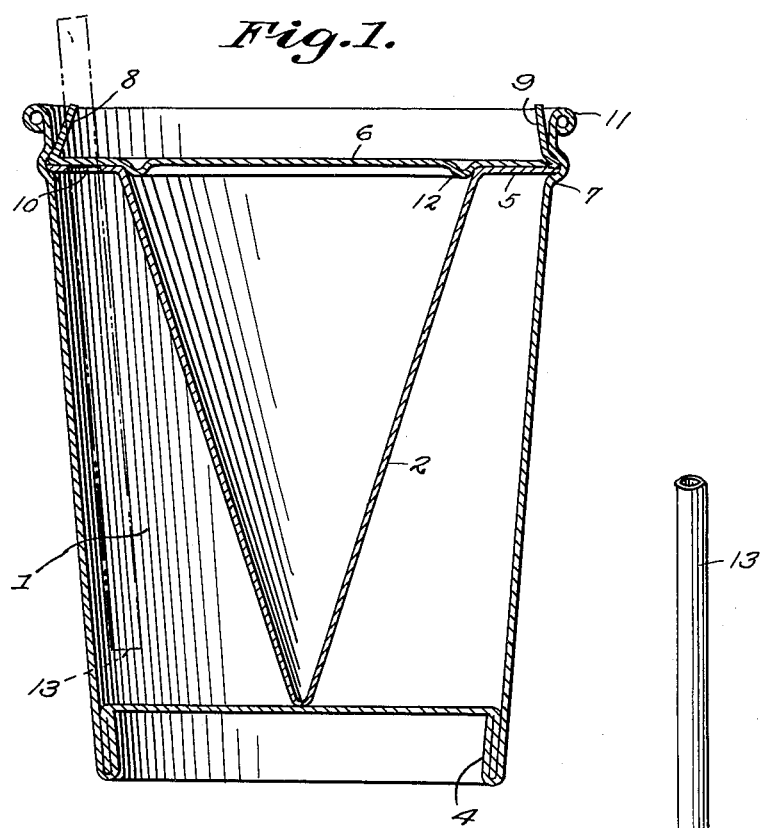
Fig.1.
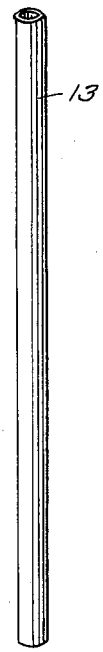
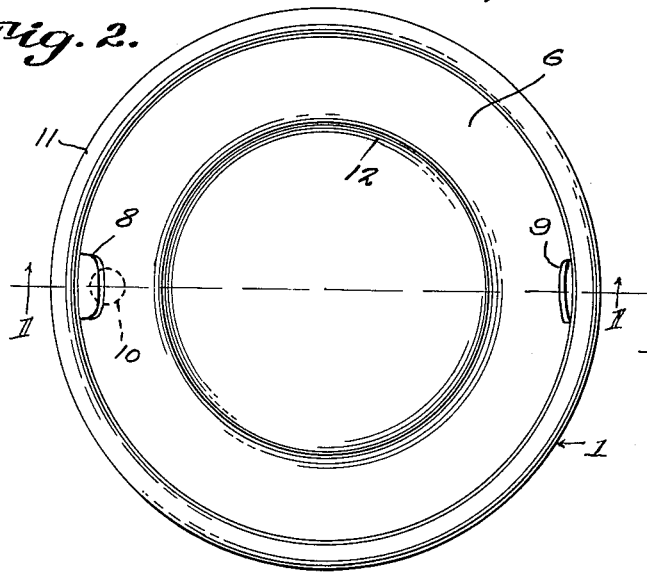
Fig.2.
Fig.3.
Rene J. Fontaine
INVENTOR
BY *CA Snow & Co.*
ATTORNEYS.

United States Patent Office 2,740,575
Patented Apr. 3, 1956

2,740,575

DISPENSING CONTAINER

Rene J. Fontaine, Salem, Mass.

Application February 25, 1953, Serial No. 338,805

2 Claims. (Cl. 229—15)

This invention relates to a container for dispensing both a solid confection such as ice cream and a potable drink such as cold water or a soft drink.

Heretofore it has been customary to dispense ice cream in a paper container in which the ice cream is packed. In most cases the waiter or waitress delivers a cup or glass of water along with the ice cream. I have designed a container for dispensing ice cream and water or the like in a single container which saves time and labor.

An object of the invention is to provide a combined dispenser for both ice cream and cold water which comprises a single vessel which contains both the ice cream and the water. With my improved container the ice cream may be packed into an inner conical container which is surrounded by water. The packed container may be kept on ice or in a suitable cooling receptacle.

A further object of the invention is to provide a dispensing container of the character described which is adapted to contain and store both ice cream and water in a single vessel which may be readily delivered to a customer for consumption on the premises or to be taken out.

Further and more limited objects of the invention will appear as the description proceeds and by reference to the accompanying drawings in which:

Fig. 1 is a view in vertical section of my improved dispensing container taken along the line 1—1 of Fig. 2.

Fig. 2 is a top plan view of my improved container and

Fig. 3 is a view of a straw of conventional design by means of which access may be obtained to the water within the vessel.

Referring now to the drawings my improved dispenser comprises an outer container or vessel 1 which is generally circular and cup shaped and within which is received a conical container 2. The container 1 is preferably formed of paper or some other suitable material and has a bottom over which the sidewalls are crimped as indicated at 4. The inner conical container 2 has a peripheral flange 5 thereon which is adapted to engage in an annular groove provided in the inner face of the outer container adjacent the top thereof. Both the inner container and the outer container are closed by a single removable cover 6 which has its peripheral edge also engaged in the groove 7 in the outer container. The cover member has a pair of tabs 8 and 9 thereon which also engage in the annular groove at the upper edge of the outer container and which serve to facilitate removal of the cover. The flange on the inner container is provided with a circular opening 10 which is normally closed by the cover member 6. This opening may be closed temporarily by a frangible seal. This opening provides suitable access for a straw to be inserted in the space between the inner and outer containers. The top of the outer container is preferably rolled over outwardly as shown at 11 in Fig. 1 so as to add rigidity to the construction. The cover member 6 is provided on its underside with an annular projection 12 which is adapted to engage about the inner edge of the conical inner container 2 as shown in Fig. 1. This serves to add rigidity to the construction and to properly position the inner container relative to the outer container.

The outer container is adapted to contain a suitable confection such as ice cream while the space between the inner and outer containers is filled or partially filled with cold water or a soft drink. The entire dispenser is handed to the customer who may remove the cover member 6 and insert a straw in the opening 10. The ice cream in the container 2 may be eaten with a spoon in a normal manner and the water may be withdrawn from the space between the two containers through the straw indicated by the reference character 13.

In filling the containers, ice cream is packed within the inner container 2 in a normal manner and the space between the two containers is filled with water or other suitable drink. It will be seen that when the cover is removed access may be had through the opening in the flange on the inner container and access may also be had to the ice cream in the container 2 in a normal manner. The lower end of the inner container 2 rests on the bottom of the outer container and is rigidly and firmly held in place. These dispensing containers are usually filled and stored within a suitable cooling compartment. When it is desired to serve a customer it is merely necessary to hand the customer the entire container together with a spoon and a straw.

It will now be clear that I have provided a dispensing container for storing and dispensing both ice cream and water which will accomplish the objects of the invention as hereinbefore stated.

It is to be understood that my dispensing container may be used for dispensing any kind of liquids or solids. For example, the inner container may contain popcorn, peanuts, potato chips or even raw or cooked foods or desserts while the outer container may contain a soft drink, a salad, a custard or sauce or an alcoholic concoction.

Various changes may be made in the details of construction and arrangement of parts without departing from the spirit of my invention. The embodiment of the invention herein disclosed is therefore to be considered merely as illustrative and not in a limiting sense as the invention is limited only in accordance with the scope of the appended claims.

What is claimed is:

1. A dispensing container comprising an outer cup shaped vessel having at its upper edge thereof an interior annular groove spaced from the upper edge thereof, an inner container disposed within said outer vessel and having its lower end resting on the bottom of said outer vessel and having a flat peripheral flange thereon secured in said annular groove, a cover closing and sealing both said cup shaped vessel and said inner container, said cover flushly engaging said flange, said flange having an opening therein adjacent the edge thereof which is normally closed by said cover and which is exposed when said cover is removed, said cover having on its underside an annular projection engaging the inner edge of said inner container for sealing the same relative to said outer vessel.

2. A dispensing container comprising an outer cup shaped vessel having adjacent its upper edge thereof an interior annular groove, an inner container disposed within said outer vessel having its lower end resting on the bottom of said outer vessel and having a flat horizontal peripheral flange thereon secured at its outer edge in said annular groove, a cover flushly engaging on said flange and closing and sealing both said cup shaped vessel and said inner container, said flange having an opening therein adjacent the edge thereof which is normally closed by said cover and which is exposed when said cover is removed, said cover having on its underside an annular projection engaging the inner edge of said inner container for sealing the same relative to said outer vessel, said cover having a pair of tabs thereon adjacent its outer edge which tabs removably engage in said annular groove, such tabs facilitating the removal of the cover.

References Cited in the file of this patent

UNITED STATES PATENTS

| | | |
|---|---|---|
| 1,514,379 | Fleischer | Nov. 4, 1924 |
| 1,665,289 | Weaver | Apr. 10, 1928 |
| 1,850,494 | Brewer | Mar. 22, 1932 |
| 2,230,747 | Greene | Feb. 4, 1941 |
| 2,275,293 | Foley | Mar. 3, 1942 |
| 2,287,610 | Guidry | June 23, 1942 |
| 2,472,079 | James et al. | June 7, 1949 |
| 2,503,045 | Hamilton | Apr. 4, 1950 |
| 2,591,578 | McNealy et al. | Apr. 1, 1952 |
| 2,637,459 | Jordan | May 5, 1953 |